US009861896B2

United States Patent
Langan et al.

(10) Patent No.: US 9,861,896 B2
(45) Date of Patent: Jan. 9, 2018

(54) METHOD AND SYSTEM FOR AN INTEGRATED PLATFORM WIDE PARTY SYSTEM WITHIN A MULTIPLAYER GAMING ENVIRONMENT

(75) Inventors: Thomas A. Langan, Seattle, WA (US); Vipul Hingne, Redmond, WA (US); Ryan Ross Cooper, Redmond, WA (US); Tian Lim, Seattle, WA (US); Andrew Murphy, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2264 days.

(21) Appl. No.: 12/204,236

(22) Filed: Sep. 4, 2008

(65) Prior Publication Data

US 2010/0056280 A1 Mar. 4, 2010

(51) Int. Cl.
*A63F 13/795* (2014.01)
*A63F 13/85* (2014.01)
(Continued)

(52) U.S. Cl.
CPC ............ *A63F 13/795* (2014.09); *A63F 13/12* (2013.01); *A63F 13/85* (2014.09);
(Continued)

(58) Field of Classification Search
CPC .......... A63F 13/12; A63F 13/30–13/88; A63F 13/70–13/798; A63F 2300/51–2300/60;
(Continued)

(56) References Cited

U.S. PATENT DOCUMENTS 6,745,236 B1 6/2004 Hawkins
6,807,562 B1 10/2004 Pennock
(Continued)

FOREIGN PATENT DOCUMENTS

WO WO2004088566 A1 10/2004

OTHER PUBLICATIONS http://blogs.msdn.com/xboxteam/archive/2006/02/08/528321.aspx; Multiparty Chat;2006;pp. 1-33.
(Continued)

*Primary Examiner* — Clayton R Williams
(74) *Attorney, Agent, or Firm* — Baker & Hostetler LLP

(57) ABSTRACT

A method and system for a platform wide party system that may be deployed in a multiplayer gaming environment. Players may associate themselves with one or more parties, wherein players within a party may choose to automatically exchange messages associated with changes in state of the players in a gaming environment. The party system exposes an API providing a plurality of function calls that may be integrated seamlessly with game play. A first player may indicate desired notification events to be received from a second player associated with the same party as the first player. Upon detection of a desired notification event on the video game console of the second player, an event notification may be communicated to a video game console of the first player causing an action to be performed on the first player's video game console. Actions may include event notifications via text and/or sound, which may be displayed to the first player while engaged in any game session and without requiring the first player to exit the current game session.

20 Claims, 11 Drawing Sheets

(51) Int. Cl.
*H04L 29/06* (2006.01)
*A63F 13/30* (2014.01)

(52) U.S. Cl.
CPC ... *A63F 2300/209* (2013.01); *A63F 2300/556* (2013.01); *A63F 2300/5566* (2013.01); *H04L 65/40* (2013.01)

(58) Field of Classification Search
CPC ........... A63F 2300/20; A63F 2300/209; H04L 65/40–65/4061
USPC ................................ 709/200–227; 463/3–45
See application file for complete search history.

(56) References Cited

U.S. PATENT DOCUMENTS

| | | | |
|---|---|---|---|
| 6,905,414 B2 | 6/2005 | Danieli | |
| 7,240,093 B1 | 7/2007 | Danieli | |
| 7,389,153 B2 | 6/2008 | Giaimo, III | |
| 2004/0097287 A1* | 5/2004 | Postrel | 463/41 |
| 2004/0176080 A1* | 9/2004 | Chakravorty | G06Q 30/0621 455/414.1 |
| 2004/0224772 A1* | 11/2004 | Canessa | A63F 13/12 463/42 |
| 2005/0227751 A1* | 10/2005 | Zanelli | A63F 13/10 463/1 |
| 2006/0135261 A1* | 6/2006 | Kinne et al. | 463/42 |
| 2006/0135264 A1* | 6/2006 | Shaw et al. | 463/42 |
| 2006/0154725 A1* | 7/2006 | Glaser et al. | 463/37 |
| 2006/0205517 A1* | 9/2006 | Malabuyo | G06F 9/4443 463/43 |
| 2006/0258463 A1* | 11/2006 | Cugno et al. | 463/42 |
| 2006/0287096 A1* | 12/2006 | O'Kelley et al. | 463/42 |
| 2007/0173325 A1* | 7/2007 | Shaw et al. | 463/42 |
| 2008/0207327 A1* | 8/2008 | Van Luchene | A63F 13/12 463/42 |
| 2008/0303811 A1* | 12/2008 | Van Luchene | 345/419 |

OTHER PUBLICATIONS http://support.microsoft.com/kb/911810; Xbox 360: How to use Private Chat on Xbox Live; 2008; p. 1-2.
http://www.sigcomm.org/sigcomm2004/workshop_papers/net503-singh1.pdf; Using Session Initiation Protocol to build Context-Aware VoIP Support for Multiplayer Networked Games; 2004; pp. 1-8.
http://xboxmeagain.blogspot.com/2006/08/37-new-titles-for-xbox-360-backward.html; The Elderly Gamer;2008; pp. 1-16.
http://www.gamasutra.com/php-bin/news_index.php?story=13208; PlayStation 3's European Backward Compatibility List Revealed;2008; pp. 1-2.
http://www.cms.livjm.ac.uk/library/CMPSEM027-CMPCD3046-OnlineGaming/Year2006-2007/CMPSEM027-CW1/Papers-to-use/kawahara_iccs02.pdf; A Peer-to-Peer Message Exchange Scheme for Large Scale Networked Virtual Environments;2008; pp. 1-5.

* cited by examiner

281

| Recipient | Party | Event | Cache |
|---|---|---|---|
| Dino | Marauders | Log On | Yes |
| Dino | Marauders | Commence Blood Puzzle | No |
| GameGirl | Screamers | Achieve High Score Doomsday | No |
| Henry | Screamers | Exit System | Yes |
| Jasper | Game Gang | Install Attack Force 9 | Yes |
| Joe15 | Cogs | Log On | No |
| Noelle | Cogs | Achieve Level 7 StarFighter | No |

| Sender | Party | Event | Action |
|---|---|---|---|
| Rex | Marauders | Log On | Text Notification |
| Rex | Marauders | Commence Blood Puzzle | Audio Notification, Request Join Game, Initiate Voice Communication |
| | | | |
| | | | |
| | | | |
| | | | |
| | | | |

FIG. 2D

METHOD AND SYSTEM FOR AN INTEGRATED PLATFORM WIDE PARTY SYSTEM WITHIN A MULTIPLAYER GAMING ENVIRONMENT

BACKGROUND

Computers and gaming systems provide a myriad of entertainment functions including gaming and interpersonal communication. Modern computer games often provide sophisticated multimedia environments involving 3-D graphics and sound to gamers and may allow multiplayer interaction over a network such as the Internet. Gaming enthusiasts typically play computer games on a platform, which may be, for example, a personal computer or dedicated gaming consoles such as the Xbox® brand Video Game Console manufactured by Microsoft Corporation.

As many games allow for or are embellished in a multiplayer environment, it is common for many gamers to establish relationships with other gamers who may share similar interests or preferences. Gamers may request to join various games that are being played by other gamers. Typically this involves sending a request or invitation to a player or players in a game that the gamer desires to join and waiting for an acceptance. Once a player joins a first multiplayer game, if the player wishes to join a second multiplayer game, the player would be required to quit the first game, return to a user interface allowing the user to indicate preference for joining the second game (e.g., a game lobby) and then send a request to join the second game.

Social networking application have also become quite popular destinations for users of the Internet and World-Wide-Web. Social networking sites typically allow users to establish "friends" or "buddies" and provide various communication services to allow friends to communicate and/or interact via the Internet.

However, the services of social networking sites and game play consoles are disjoint. Game play consoles and their associated software and services provide little ability for encouraging social networking type interaction and the associated conveniences of this functionality. Typically, a gamer seeking a multiplayer gaming session may start a game on a gaming console and then initiate a series of instructions to the console to connect, for example via a network, to a game server. The user may then be presented via the game server with a virtual "lobby", where the gamer may view various games in progress or about to commence and particular names of gamers currently involved in those games. The user may then elect to join a particular game that is soon about to commence or currently in progress and thereby participate in a multiplayer game session with participants of his or her choosing.

Conventional scenarios and systems such as that described present a number of inconveniences and inefficiencies to participants seeking a multiplayer session. A gamer seeking to participate in a session with one or more particular users may be faced with the prospect of navigating through many menus in order to find the particular gamers he or she is interested in. It is quite possible that the gamer may be unable to find particular gamers he or she is interested in. In addition, once game play has commenced, a gamer will be immersed in the game and is not provided with a mechanism to track the current status of other gamers or otherwise remain in communication with them outside the confines of the particular game he or she is playing. Furthermore, gamers do not have access to an active resource that will initiate introductions to other gamers sharing their interests or preferences.

Based upon the foregoing, there is a clear need for seamless integration of social networking types of services within the software and services provided by gaming systems in a multiplayer environment.

SUMMARY

A method and system provides for a platform wide party system that may be deployed in a multiplayer gaming environment. Players may associate themselves with one or more parties. By associating themselves with parties, players may form communal groups having shared interests and preferences with respect to game play. A party system API ("Application Programming Interface") is provided that exposes various functions that may be executed with respect to party services. These services may be integrated in a seamless manner with game play and API calls may be performed from running game titles to cause the execution of various party services.

According to one embodiment, the party system provides a messaging platform and associated API function calls to allow players within a party to exchange messages regarding events that may have occurred on their respective video game console.

A first player may indicate desired notification events to be received from a second player associated with the same party as the first player. The desired notification events may be stored on a video game console of the second player. Upon detection of a desired notification event on the video game console of the second player, an event notification may be communicated to a video game console of the first player. An event handler on the first player's video game console may cause an action to be performed on the first player's video game console by, for example, causing an associated function call for the event via the party API. Actions may include event notifications via text and/or sound, which may be displayed to the first player while engaged in any game session and without requiring the first player to exit the current game session.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

FIG. 2C depicts an exemplary recipient event table according to one embodiment.

FIG. 2D depicts an exemplary sender event table.

DETAILED DESCRIPTION OF ILLUSTRATIVE EMBODIMENTS

Figure 1A:
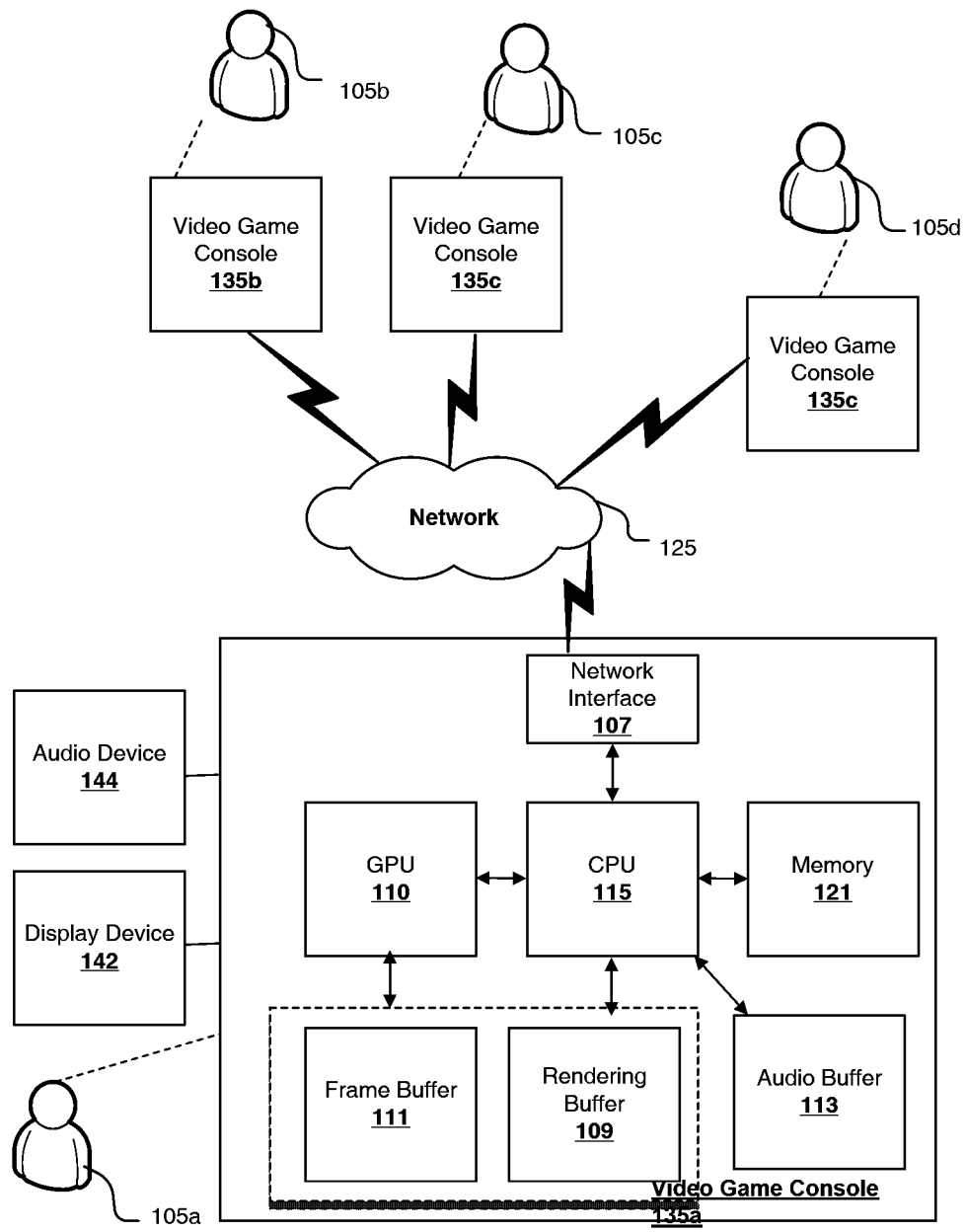
FIG. 1A detects an exemplary environment in which a party system may be deployed.

FIG. 1A detects an exemplary environment in which a party system may be deployed. An arbitrary number of players 105a-105d may each be associated with a respective video game console 135a-135d. Video game consoles 135a-135d may each provide a platform for hosting a video game for a respective player 105a-105d. A video game also referred to herein as a video game title or title may comprise program instructions, resources, multimedia content involving sound and graphics etc., which when executed on a respective video game console may provide a multimedia video game experience to a user.

A party system (shown and described with respect to FIG. 1B) may be deployed on any of the video game consoles 135a-135d. As described in more detail below, a party system may comprise any number of processes to receive information regarding associations between players and parties, maintain state information regarding players' associations with particular parties, detect events relating to particular game players and allow for communication of selected events between and among game players associated with a particular party even if players within the party are engaged in different game play session.

An expanded view of a video game console 135a on which a participant system may be deployed is also shown in FIG. 1A. Video game console 135a may include network interface 107, GPU ("Graphics Processing Unit") 110, and CPU ("Central Processing Unit") 115. CPU 115 may provide a general-purpose computer that may concurrently execute any number of processes or tasks. Video game titles running on videogame console 135a (not shown in FIG. 1) may each comprise a process or task executed by CPU 115. Memory block 121 may store program instructions and/or data relating to processes or tasks executed by CPU 115. Thus, CPU 115 may retrieve or store data in memory block 121 in order to perform processing. For example, videogame titles may be stored in memory block 121 and CPU 115 may access these instructions.

GPU 110 may provide a specialized and dedicated processor for performing graphics processing and rendering. GPU 110 may utilize frame buffer 111 and rendering buffer 109 in order to perform graphics processing and rendering. Frame buffer 111 may be a video output device that displays a video display from a complete frame of data. Information in frame buffer 111 may comprise color values for every pixel to be displayed on a display device 140. Data in frame buffer 111 may be subject to further processing and rendering by GPU 111 the result of which may be stored in rendering buffer 109. Additional rendering may include personal information of a user 105a.

Audio buffer 113 may store rendered audio data relating to a video game title executing on video came console 135. Data stored in audio buffer may be digital audio samples of audio information.

CPU 110 may interact with network interface 107 to cause information to be transmitted over network 125. In addition, CPU 110 may interact with network interface 107 in order to receive information transmitted over network 125, for example, for other users such as users 105b-105d. Video game console 135a may output rendered video for display on display device 142 and rendered audio for playback on audio device 144.

Figure 1B:
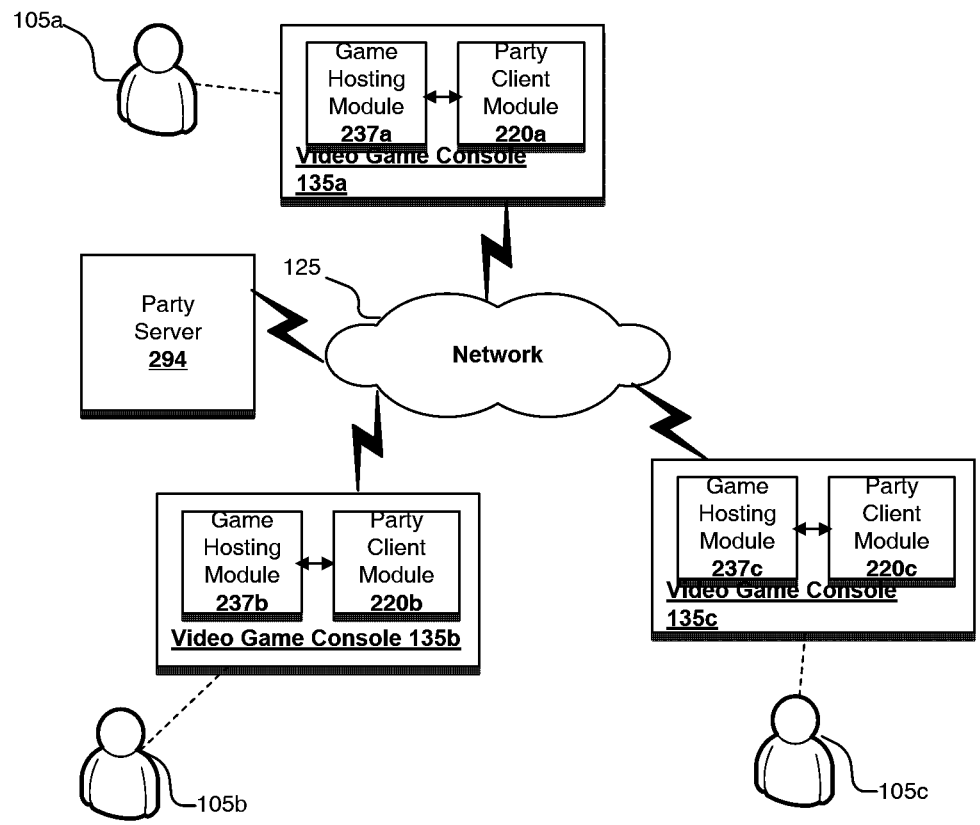
FIG. 1B depicts a deployment of a party system in a multiplayer gaming environment.

FIG. 1B depicts a deployment of a party system in a multiplayer gaming environment. Players 105a-105c may respectively use video game consoles 135a-135 to participate in video games, which may include multiplayer video game sessions. Thus, for example players 105a and 105b may respectively use video game consoles 135a and 135b to participate in a multiplayer game session. As shown in FIG. 1B video game consoles 135a-135c and party server 294 are coupled to network 125 and may communicate with one another via network 125.

Game hosting modules 237a-237c may be respectively deployed on each video game console 135a-135c. Each game hosting module 237a-237c may provide services to allow a respective player (i.e., 105a-105c) to participate in a single player or multiplayer video game session. The services may be made available via an API ("Application Programming Interface"), which is not depicted in FIG. 1B. For example, game hosting modules 237a-237c may each provide services for low level support for a video game session such as APIs for interacting with graphics hardware, loading a desired video game from a library, establishing network connections with other players in a multiplayer session, saving and retrieving state information regarding video games in progress, etc.

A party system may be deployed in the multiplayer environment shown in FIG. 1B comprising the aggregate collection of a plurality of party client modules 220a-220c and party server 294. In particular, a party client module 220a-220c may be deployed on each respective video game console 135a-135c. As described in detail below, each party client module 220a-220c may perform services including detecting events related to respective users 105a-105c including events related to game play as well as other events that relate to the state of a player within an online session. Other events may include, for example, a player's logging onto party server 294, a party navigating a menu system, etc. Party server 294, as described in detail below, may maintain state information regarding game players' associations with particular parties, game player preferences, etc. In addition, party server 294 may from time to time update party client processes 220a-220c using the state information as described below.

Figure 2A:
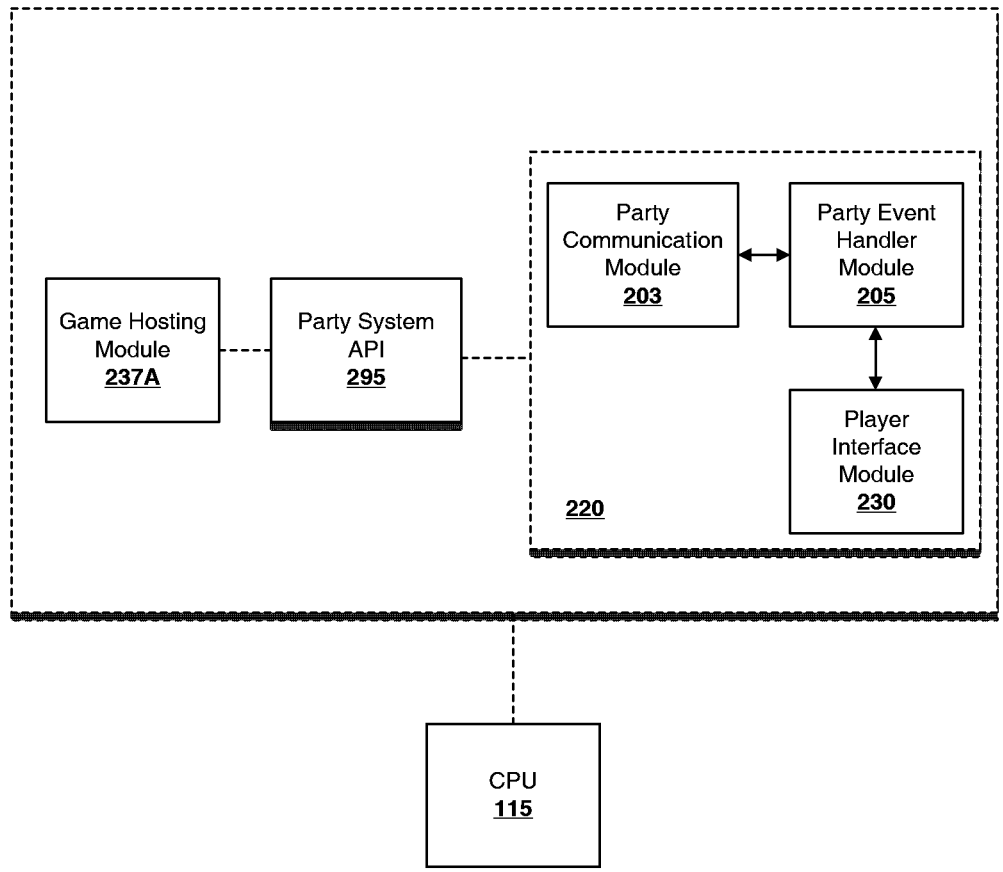
FIG. 2A depicts an exemplary architecture of a party client module 220 according to one embodiment.

FIG. 2A depicts an exemplary architecture of a party client module 220 according to one embodiment. Game hosting module 237A may be deployed to execute on CPU 115. Party client module 220 may also be deployed to execute on CPU 115. Party client module 220 may comprise party communication module 203, party event handler module 205 and player interface module 230. Game hosting module 237A may invoke services and function of party client module 220 via party system API 295, which is described in more detail below. Thus, games executing via game hosting module 237A may call services and functions of party client module 220 via party system API 295 in order to invoke these services with tight integration with game play. Further, using the arrangement shown in FIG. 2A, services provided by party client module may be available within games running via game hosting module 237A without requiring players to exit a running game before executing the services.

Party client module 220 may comprise party communication module 203, party event handler module 205 and player interface module 230. Party event handler module 205 may perform functions to detect events occurring on a video game console on which party client process is executing. Events may comprise events occurring in video games executing via game process 210 or other events relating to the state of the player using the video game console. For example, state events may comprise events relating to the player's logging onto party server 294, navigating various administrative menus, changing preference information, electing to join a particular multiuser game session, etc. Depending on the nature of detected events, party event handler module 205 may perform certain functions including notifying other players of the occurrence of the events.

Party communication module 203 may perform functions to transmit information over a network and receiving information from a network. Thus, for example, upon receiving notification of a relevant event, party event handler module 205 may transmit information regarding the event to party communication module 203 in order to cause the transmission of the event over a network to a relevant party. On the other hand, party communication module 203 may also receive notification of events generated by other players in a multiplayer environment and transmit those notifications to party event handler module for processing 205. An exemplary process executed by a party communication module both for detection of events and processing of received events is described in detail below.

Player interface module 230 may perform functions to display a graphical user interface ("GUI") to players. Exemplary information that may be displayed on a GUI may include information regarding relevant events generated by other players. According to one embodiment, this information may be displayed seamlessly with a game play screen. An exemplary GUI is described in detail below.

Figure 2B:
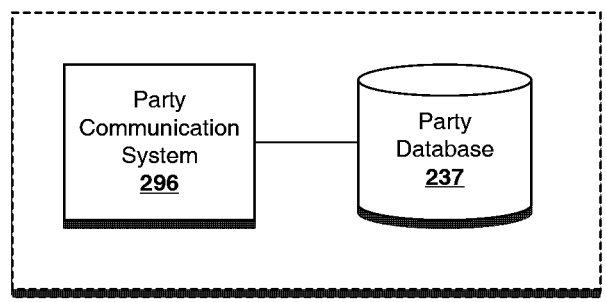
FIG. 2B depicts an exemplary architecture of a party server according to one embodiment.

FIG. 2B depicts an exemplary architecture of a party server according to one embodiment. Party server 294 may comprise party communication system 296 and party database 237. Party database 237 may store state information regarding particular players including their party affiliations, online/offline status, etc. An exemplary schema of a party database 237 is described below. Party communication system 294 may perform functions to establish communications with game players including transmission of state information regarding players to other players in an associated party. For example, party communication system 294 may transmit the online or offline status of particular players to other players of a party with which the player is associated.

FIG. 2C depicts an exemplary recipient event table according to one embodiment. According to one embodiment, players acting as recipients may subscribe to events from other players they wish to know about. Event subscription may be accomplished by sending a request to the player for whom particular event notifications are requested. Recipient event table 281 may be stored locally on a video game console associated with a user and utilized by party event handler module 205 running on that video game console to determine events of the player to transmit to other players, herein referred to as recipients. According to one embodiment, event action table 281 may comprise recipient column, party column, event column and cache column. Recipient column may store identifiers of players that have been designated as recipients to receive particular events. Party column stores a name of an associated party for a recipient. Event column stores a particular event to transmit to a recipient. As will be described below, an event may be transmitted in a specific format herein referred to as an event message. Cache column stores a binary value indicating whether the event should be cached locally if the recipient is not online when the event is generated.

It is assumed for purposes of this discussion that the exemplary event table belongs 281 shown in FIG. 2C belongs to a hypothetical player Rex and may be stored locally on his video game console. According to this example, Dino who is a member of the party Marauders has been designated to receive an event message when Jim logs onto a party sever. And, this event is designated to be cached. Dino is also designated to receive an event message when Rex commences play of the video game entitled Blood Puzzle. This event is designated not to be cached. GameGirl, who is a member of the Screamers party, has been designated to receive an event notification if Rex achieves a high score in Doomsday and the event is not to be cached. Henry who is also a member of the Screamers party has been designated to receive an event notification if Rex exits (i.e., logs off) the system. Jasper who is a member of the party called GameGang has been designated to receive an event notification if Rex installs the game Attack Force 9 and this event is to be cached. Further, according to exemplary recipient event table 281, Joe15 of the Cogs party is to be notified if Rex logs on and the event is not to be cached. Noelle of the cogs is designated to receive an event notification if Rex reaches level 7 of StarFighter and the event is not to be cached.

FIG. 2D depicts an exemplary sender event table. The sender event table may comprise a sender column, a party column, an event column, and an action column. The sender column may my store the name of a sending player. The party column may store the name of an associated party for each sending player. The event column stores information regarding a type of incoming event that may be received from a corresponding player. The action column may store an action to be undertaken with respect to a particular incoming event received from a player.

According to one embodiment, actions may be undertaken by party event handler module 205 as described below. In particular, in order to undertake an action, a function or service implemented by party system API 295 may be called using that API. As described in more detail below, party system API 295 may provide services for player notification, initiation of communication sessions between players, automated invitations for players to join particular games. In general, any action may be automated and made available via a function or service available through party system API in order to execute the action. In addition, a scripting functionality may be provided to allow the combination of multiple actions and thereby multiple calls via party system API 295.

For purposes of this discussion, it is assumed that sender event table 282 belongs to a hypothetical player Dino, who was also referenced in recipient event table 281. According to this example, upon receiving an event notification from Rex of the Marauders that Rex has logged on, Dino is notified of this event with a text notification that may be displayed without requiring Dino to cancel or close any game play session currently in progress. In addition, according to exemplary sender event table 282, upon receiving an event notification from Rex of the Marauders that Rex has commenced the game Blood Puzzle, an audio notification is provided to Dino, a request to join Rex in the Blood Puzzle session is provided to Dino and a voice communication session is initiated between Dino and Rex.

Figure 2E:
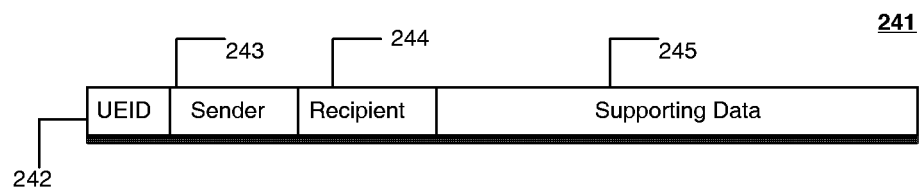
FIG. 2E depicts an exemplary structure of an event message according to one embodiment.

FIG. 2E depicts an exemplary structure of an event message according to one embodiment. Event message 241 may comprise unique event identifier field ("UEID") 242, Sender field 243, Recipient field 244 field and Supporting Data field 245. UEID field 242 may store a unique identifier of an event in the message. According to one embodiment, a master table of event types may be generated and a UEID assigned to each event type. Sender field 243 may store an identifier of the sender of the event. Recipient field 244 may store a unique identifier of the intended recipient of the event message. Supporting Data field 245 may store any additional data that may assist an event handler at the recipient in interpreting the event or carrying out an associated action in response to receiving the event message.

Figure 3:
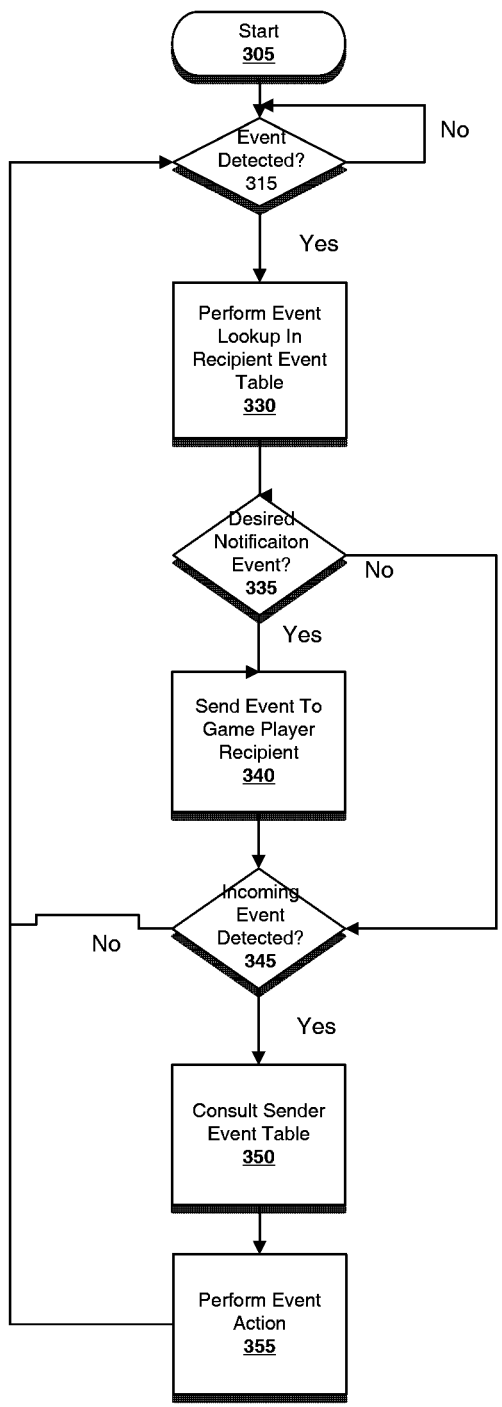
FIG. 3 is a flowchart of a process that may be performed by a party event handler module.

FIG. 3 is a flowchart of a process that may be performed by a party event handler module. The process is initiated in 305. In 315, if an event is not detected ('No' branch of 315), flow continues with 315. If an event is detected in 315 ('Yes' branch of 315), flow continues with 330 and a recipient event table on the video game console is consulted to determine whether the detected event is one for which a recipient has requested notification. In 335, if the detected event is not a desired notification event ('No' branch of 335), flow continues with 345. If the event is a desired notification event ('Yes' branch of 335), flow continues with 340 and an event message is created and sent to the intended recipient(s) as determined from the recipient event table.

In 345, it is determined whether an incoming event has been received from a sender. If not ('No' branch of 345), flow continues with 315. If so ('Yes' branch of 345) flow continues with 350 and the sender event table is consulted to look up the received event. In 355, the action corresponding to the event as determined from the sender event table is performed. Flow then continues with 315.

Figure 4A:
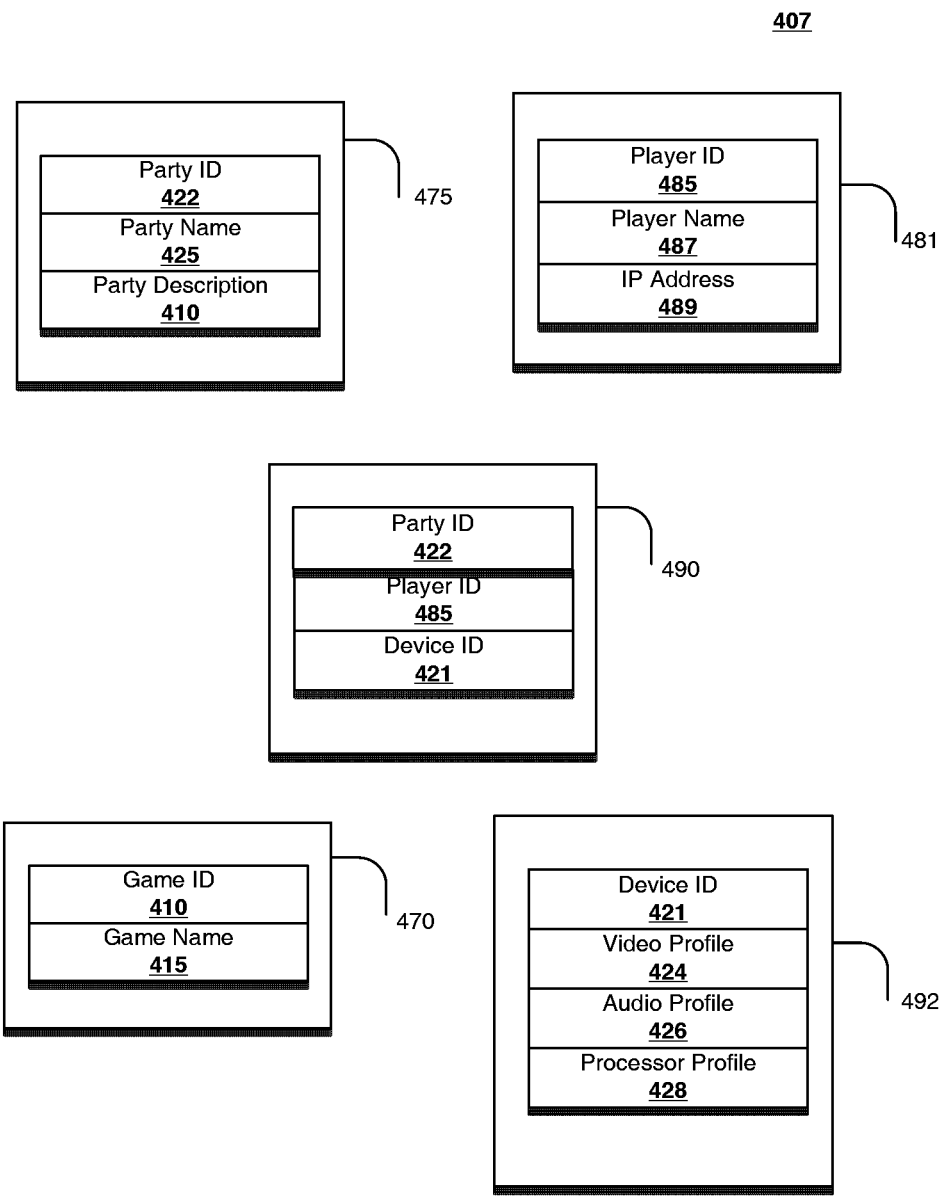
FIG. 4A depicts an exemplary schema of a party database that may be stored at a party server.

FIG. 4A depicts an exemplary schema of a party database that may be stored at a party server. According to one embodiment party database 237 may comprise party table 475, player table 481, party-player association table 490, game table 470 and device table 492. In general, party database 237 may store any information related to a party system. According to one embodiment, information regarding the current state of a player with respect to games he or she is currently playing is stored locally and the respective video game console. However, according to alternative embodiments this information may be stored at the party server within party database 237.

Party table 475 may comprise party ID field 422, party name field 425 and party description field 410. Party ID field 422 may store a unique identifier for a party. Party name field 425 may store a unique name for a party. Party description field 410 may store a description of a party.

Player table 481 may comprise player ID field 487, player name field 487 and IP address field 489. Player ID field may store a unique identifier of a player. Player name field 487 may store a name for a player associated with a player ID stored in player ID field 487. IP address field 489 may store an IP address of a player that has logged onto party server 294. In the case that the player is not logged on, IP address field 489 may be set to NULL.

Device table 492 may comprise device ID field 421, video profile field 424, audio profile field 426 and processor profile field 428. Device ID field 421 may store a unique identifier of a device and in particular a video game console. Video profile field 424 may store information indicating an associated video profile and capabilities for the device. Audio profile field 426 may store information indicating an associated audio profile and capabilities for a device. Processor profile field 428 may store information indicating a processor profile of a device.

Party player association table 490 may comprise party ID field 422, player ID field 485 and device ID field 421. Thus, in order to associate a player with a particular party and device, corresponding entries in a player association table 490 may be created. According to one embodiment a single player may be associated with more than one party and/or multiple players may be associated with a single device.

Game table 470 may comprise game ID field 410 and game name field 415. Game ID field 410 may store a unique identifier of a video game. Game name field may store a name of a video game associated with a game ID stored in game ID field 410.

Figure 4B:
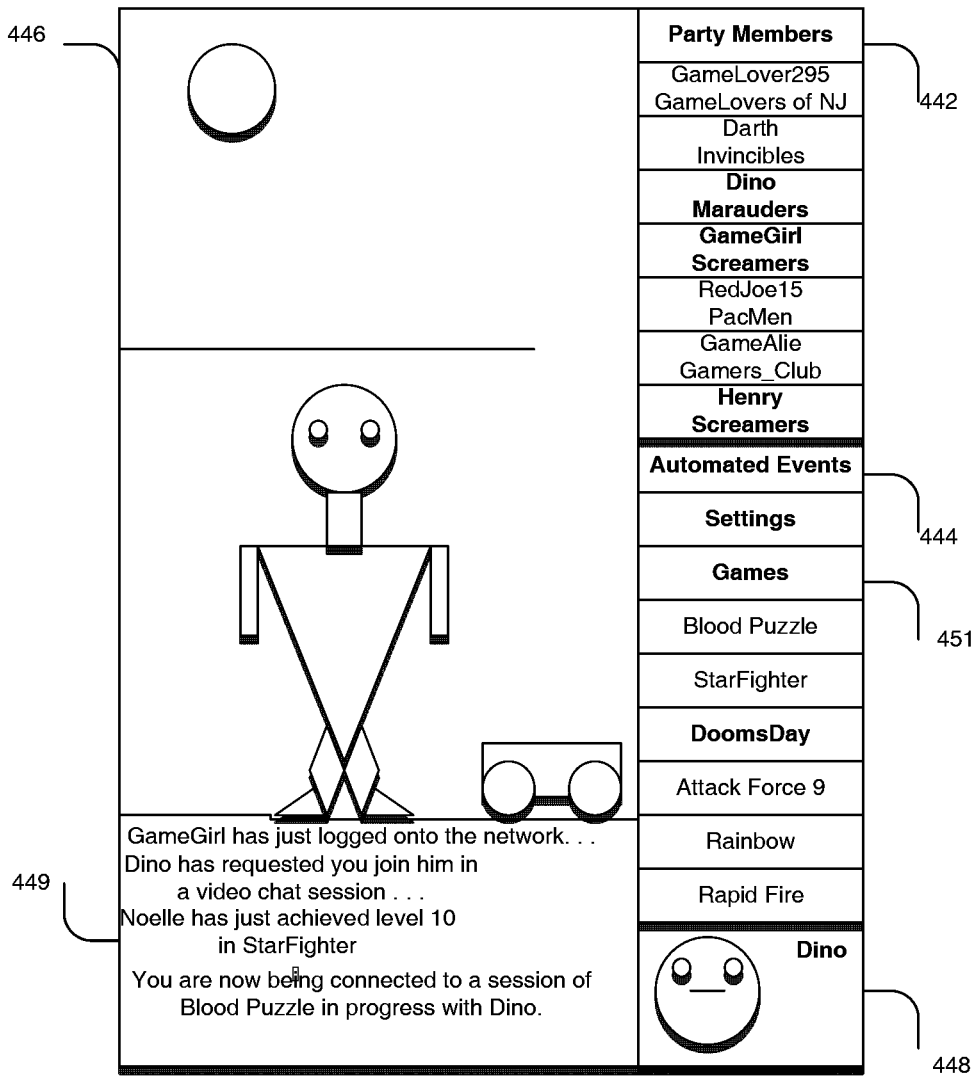
FIG. 4B shows an exemplary party interface GUI that may be generated by a GUI module that may be part of a participant interface process.

FIG. 4B depicts an exemplary GUI for integrated presentation of game play and party system information. GUI 461 may be generated and displayed by a player interface module 230 running on a video game console associated with a game player. GUI 461 may comprise game play pane 446, party members pane 442, automated events selection button 444, games pane 451, video chat pane 448 and text event notification pane 449.

Game play pane 446 may present game play action for a current game that a player is currently playing. Party members pane 442 may show other players and their respective online/offline status (indicated in bold) along with their associated party. Thus, according to the example shown in FIG. 4B, gamers GameLover295, Darth, Dino, GameGirl, RedJoe15, GameAlie and Henry are all players associated with the player. Dino and GameGirl are currently online. As shown in FIG. 4B associated players may belong to different parties as noted because a player may be associated with multiple parties. Automated events selection button 444 may allow a player to initiate a selection of events the player desires to be notified of with respect to other players and may cause the initiation of an additional GUI for selection of these event. Games pane 451 may show current games installed on the associated video game console. Video chat pane 448 may allow for a video and audio chat session with a player even if that that player is not currently in a multiplayer game session with the associated game player.

Event notification pane 449 may display textual indicators of events that the associated player has subscribed to with respect to other players. These event notifications may be displayed to the associated player without requiring the player to exit the current gaming session.

Figure 5:
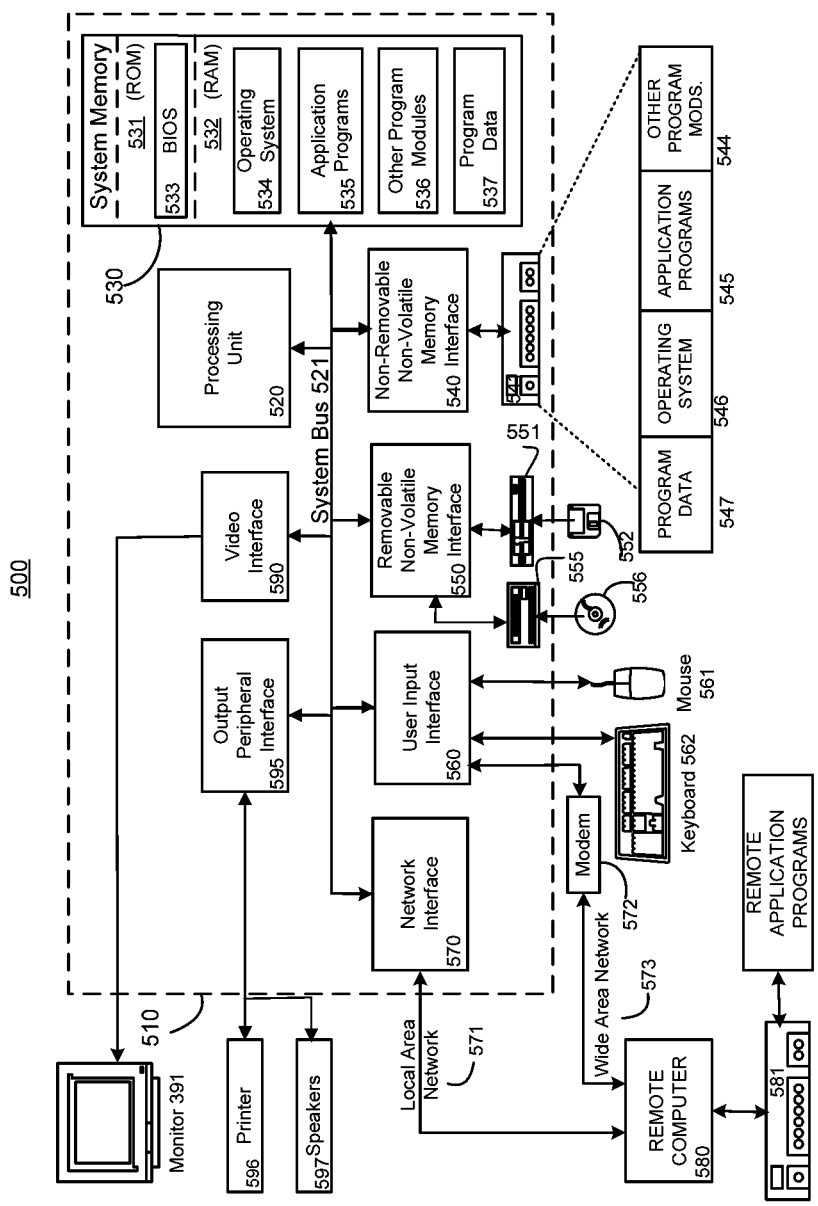
FIG. 5 shows an exemplary computing environment in which aspects of the example embodiments may be implemented.

FIG. 5 shows an exemplary computing environment in which aspects of the example embodiments may be implemented. Computing system environment 500 is only one example of a suitable computing environment and is not intended to suggest any limitation as to the scope of use or functionality of the described example embodiments. Neither should computing environment 500 be interpreted as having any dependency or requirement relating to any one or combination of components illustrated in exemplary computing environment 500.

The example embodiments are operational with numerous other general purpose or special purpose computing system environments or configurations. Examples of well known computing systems, environments, and/or configurations that may be suitable for use with the example embodiments include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The example embodiments may be described in the general context of computer-executable instructions, such as program modules, being executed by a computer. Generally, program modules include routines, programs, objects, components, data structures, etc. that perform particular tasks or implement particular abstract data types. The example embodiments also may be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing the example embodiments includes a general purpose computing device in the form of a computer 510. Components of computer 510 may include, but are not limited to, a processing unit 520, a system memory 530, and a system bus 521 that couples various system components including the system memory to processing unit 520. Processing unit 520 may represent multiple logical processing units such as those supported on a multi-threaded processor. System bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). System bus 521 may also be implemented as a point-to-point connection, switching fabric, or the like, among the communicating devices.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

System memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

Computer 510 may also include other removable/non-removable, volatile/nonvolatile computer storage media. By way of example only, FIG. 6 illustrates a hard disk drive 540 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 541 is typically connected to system bus 521 through a non-removable memory interface such as interface 540, and magnetic disk drive 551 and optical disk drive 555 are typically connected to system bus 521 by a removable memory interface, such as interface 550.

The drives and their associated computer storage media discussed above and illustrated in FIG. 5, provide storage of computer readable instructions, data structures, program modules and other data for computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to processing unit 520 through a user input interface 560 that is coupled to the system bus, but may be connected by other interface and bus structures, such as a parallel port, game port or a universal serial bus (USB). A monitor 591 or other type of display device is also connected to system bus 521 via an interface, such as a video interface 590. In addition to the monitor, computers may also include other peripheral output devices such as speakers 597 and printer 596, which may be connected through an output peripheral interface 595.

Computer 510 may operate in a networked environment using logical connections to one or more remote computers, such as a remote computer 580. Remote computer 580 may be a personal computer, a server, a router, a network PC, a peer device or other common network node, and typically includes many or all of the elements described above relative to computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, computer 510 is connected to LAN 571 through a network interface or adapter 570. When used in a WAN networking environment, computer 510 typically includes a modem 572 or other means for establishing communications over WAN 573, such as the Internet. Modem 572, which may be internal or external, may be connected to system bus 521 via user input interface 560, or other appropriate mechanism. In a networked environment, program modules depicted relative to computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Computing environment 500 typically includes at least some form of computer readable media. Computer readable media can be any available media that can be accessed by computing environment 500. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing environment 500. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

The inventive subject matter is described with specificity to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies.

What is claimed:

1. A method for providing party services in a multiplayer gaming environment comprising at least one first player and a second player, wherein the at least one first player is respectively associated with a first video game console and the second player is associated with a second video game console, the method comprising:
   receiving party association information, wherein the party association information indicates a party relationship between the at least one first player and the second player;
   receiving recipient event information indicating an association of each of at least one first player and each of at least one desired notification event, wherein each of the at least one desired notification event pertains to a session behavior of the second player; and
   in response to detecting that an event has occurred with respect to the second player:
      determining whether the event is a desired notification event of the at least one desired notification event of an associated first player using the recipient event information; and
      when the event is a desired notification event of the associated first player, alerting the associated first player of the event while the associated first player is in a first game session and without cancelling or exiting the first game session and wherein the second player is in a second game session that is different from the first game session;
   wherein the at least one desired notification event is requested via an application programming interface (API) that is configured to provide a plurality of function calls that are integrated with game play of the first and second video game consoles; and
   wherein an event table is used to identify recipients who have subscribed to notification events, the event table stored at least on the second video game console and accessed by an party event handler of the second video game console to determine the at least one desired notification event.

2. The method of claim 1, wherein each video game console is coupled to a network.

3. The method of claim 2, wherein alerting the associated first player of the event further comprises transmitting a message via the network to the first video game console of the associated first player, wherein the message includes an identifier of the desired notification event.

4. The method of claim 3, wherein upon receipt of the message, an associated action is automatically performed on the first video game console of the associated first player.

5. The method of claim 4, wherein the action is performed by:
   parsing the message to determine the identifier of the desired notification event; and
   calling an API function corresponding to the identifier.

6. The method of claim 5, wherein the action corresponds to displaying a notification on a GUI ("Graphical User Interface") provided by the first video game console of the associated first player, wherein the GUI includes at least a game play pane and a message pane, wherein the game play pane displays game play information and the message is displayed in the message pane.

7. The method of claim 1, wherein the at least one desired notification event includes a logging on of the second player to a game server.

8. The method of claim 1, wherein the at least one desired notification event includes an achievement of a high score in a video game.

9. The method of claim 1, wherein the at least one desired notification event includes an achievement of a particular level in a video game.

10. The method of claim 1, wherein the at least one desired notification event includes an installation of a particular video game title.

11. A system for providing party services in a multiplayer gaming environment comprising at least one first player and a second player, wherein the at least one first player is respectively associated with a first video game console and the second player is associated with a second video game console, the system comprising:
a processor and a memory storing instructions that, when executed by the processor, cause the system to perform operations comprising to:
receive party association information, wherein the party association information indicates a party relationship between the at least one first player and the second player;
receive recipient event information indicating an association of each of at least one first player and each of at least one desired notification event, wherein each of the at least one desired notification event pertains to a session behavior of the second player; and
in response to detecting that an event has occurred with respect to the second player:
determine whether the event is a desired notification event of the at least one desired notification event of an associated first player using the recipient event information; and
when the event is a desired notification event of the associated first player, alert the associated first player of the event while the associated first player is in a first game session and without exiting the first game session and wherein the second player is in a second game session that is different from the first game session;
wherein the at least one desired notification event is requested via an application programming interface (API) that is configured to provide a plurality of function calls that are integrated with gameplay of the first and second video game consoles; and
wherein an event table is used to identify recipients who have subscribed to notification events, the event table stored at least on the second video game console and accessed by an party event handler of the second video game console to determine the at least one desired notification event.

12. The system of claim 11, wherein each video game console is coupled to a network.

13. The system of claim 12, the processor is further adapted to transmit a message via the network to the first video game console of the associated first player, wherein the message includes an identifier of the desired notification event.

14. The system of claim 13, wherein the first video game console of the associated first player comprises a second processor adapted to upon receipt of the message, automatically perform an action on the first video game console of the associated first player.

15. The system of claim 14, wherein the second processor is further adapted to:
parse the message to determine the identifier of the desired notification event; and
call an API function corresponding to the identifier.

16. The system of claim 15, wherein the action corresponds to displaying a notification on a GUI ("Graphical User Interface") provided by the first video game console of the associated first player, wherein the GUI includes at least a game play pane and a message pane, wherein the game play pane displays game play information and the message is displayed in the message pane.

17. A machine readable storage medium, other than a signal, containing instructions for providing party services in a multiplayer gaming environment comprising at least one first player and a second player, wherein the at least one first player is respectively associated with a first video game console and the second player is associated with a second video game console, the instructions comprising instructions for:
receiving party association information, wherein the party association information indicates a party relationship between the at least one first player and the second player;
receiving recipient event information indicating an association of each of at least one first player and each of at least one desired notification event, wherein each of the at least one desired notification event pertains to a session behavior of the second player;
in response to detecting that an event has occurred with respect to the second player:
determining whether the event is a desired notification event of the at least one desired notification event of an associated first player using the recipient event information;
when the event is a desired notification event of the associated first player, transmitting an event message to the associated first player while the associated first player is in a first game session and without exiting the first game session and wherein the second player is in a second game session that is different from the first game session;
wherein the at least one desired notification event is requested via an application programming interface (AP) that is configured to provide a plurality of function calls that are integrated with gameplay of the first and second video game consoles; and
wherein an event table is used to identify recipients who have subscribed to notification events, the event table stored at least on the second video game console and accessed by an party event handler of the second video game console to determine the at least one desired notification event.

18. The machine readable storage medium of claim 17, wherein each video game console is coupled to a network.

19. The machine readable storage medium of claim 18, wherein alerting the associated first player of the event further comprises transmitting a message via the network to the first video game console of the associated first player, wherein the message includes an identifier of the desired notification event.

20. The machine readable storage medium of claim 19, wherein upon receipt of the message, an associated action is automatically performed on the first video game console of the associated first player.

\* \* \* \* \*